United States Patent [19]

FitzGerald

[11] Patent Number: 5,382,958
[45] Date of Patent: Jan. 17, 1995

[54] TIME TRANSFER POSITION LOCATION METHOD AND APPARATUS

[75] Inventor: Mark R. FitzGerald, Phoenix, Ariz.

[73] Assignee: Motorola, Inc., Schaumburg, Ill.

[21] Appl. No.: 195,900

[22] Filed: Feb. 14, 1994

Related U.S. Application Data

[63] Continuation of Ser. No. 991,936, Dec. 17, 1992, abandoned.

[51] Int. Cl.$^6$ ............................ G01S 1/08; G01S 5/02; F41G 3/26
[52] U.S. Cl. ................................... 342/386; 342/357; 342/387; 434/16; 434/23
[58] Field of Search .................... 342/386, 387, 357

[56] References Cited

U.S. PATENT DOCUMENTS

| | | | |
|---|---|---|---|
| 4,229,737 | 10/1980 | Heldwein et al. | 342/46 |
| 4,445,118 | 4/1984 | Taylor et al. | 343/357 |
| 4,591,730 | 5/1986 | Pennoni | 370/104 |
| 4,652,884 | 3/1987 | Starker | 342/357 |
| 4,682,953 | 7/1987 | Doerfel et al. | 434/16 |
| 4,744,761 | 5/1988 | Doerfel et al. | 434/16 |
| 4,812,991 | 3/1989 | Hatch | 364/458 |
| 4,866,450 | 9/1989 | Chisholm | 342/410 |
| 4,976,619 | 12/1990 | Carlson | 434/16 |

*Primary Examiner*—Gregory C. Issing
*Attorney, Agent, or Firm*—Frank J. Bogacz

[57] ABSTRACT

A time transfer position location method and arrangement. A mission control station initiates a number of relays placed throughout a simulated battlefield. Each of the relays then obtains position and time information from a Global Positioning System (GPS) satellite. Each relay repeatedly transmits position information (timing pulse) in a particular time slot over the playing field. In addition, fire mission information which includes type of munition deployed and its range and affects is also transmitted.

12 Claims, 3 Drawing Sheets

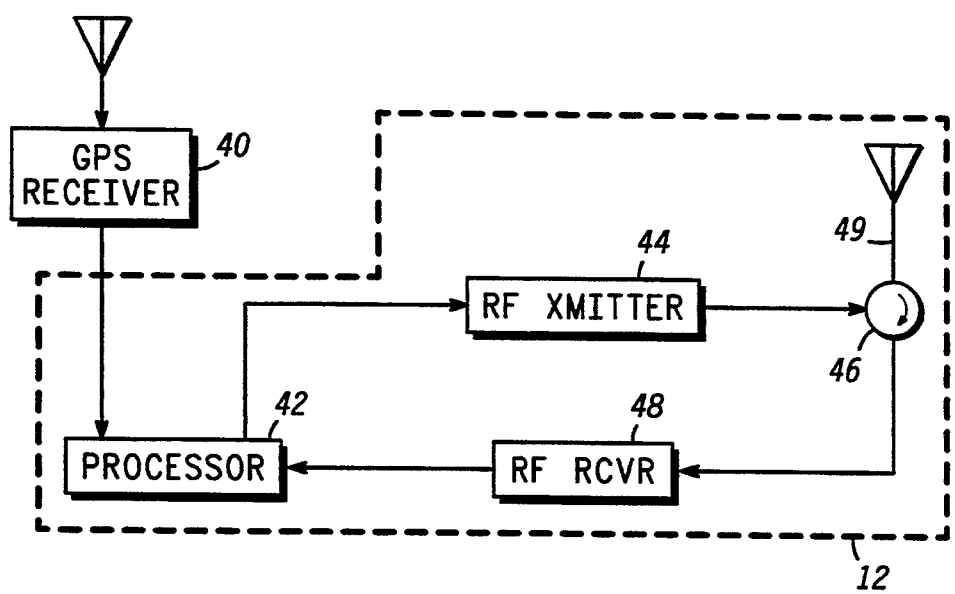
FIG. 2
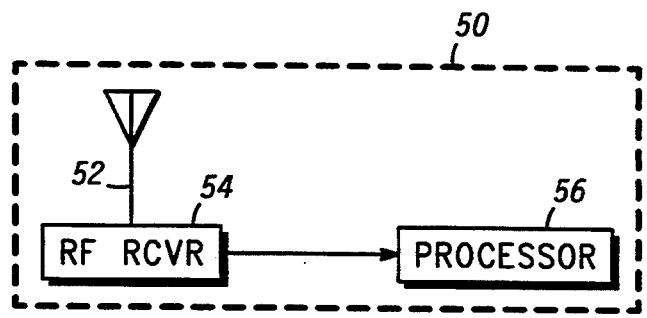
FIG. 3
FIG. 5
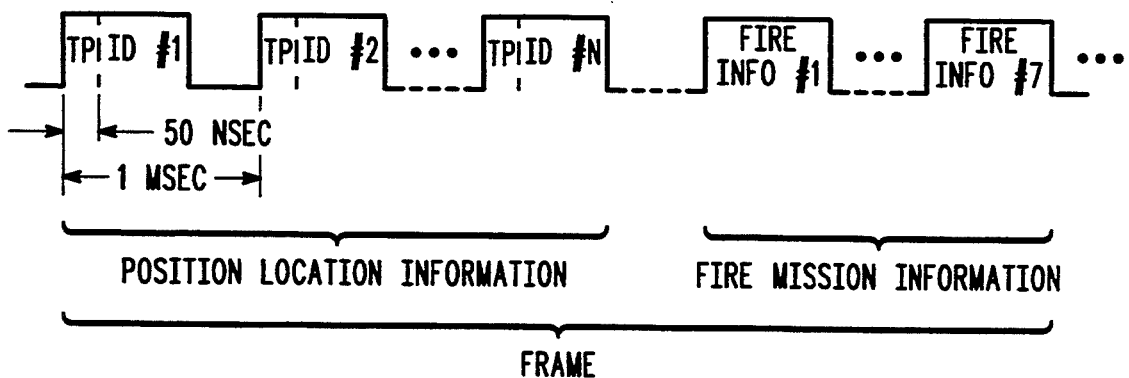

TIME TRANSFER POSITION LOCATION METHOD AND APPARATUS

This application is a continuation of prior application Ser. No. 07/991,936, filed Dec. 17, 1992, now abandoned.

BACKGROUND OF THE INVENTION

The present invention pertains to simulated battlefield position location and more particularly to a synchronized multi-lateration position location arrangement for determining the affects of simulated munitions deployment upon a target.

Position location detectors are used to determine the location of individuals or vehicles with respect to simulated munitions in order to determine whether injury or damage was inflicted upon the individuals or vehicles. The battlefield for war games is established. Relays are located around and throughout this battlefield area. These relays transmit signals which cover the area of the battlefield. Players, which may be vehicles or dismounted troops, are equipped with location detectors which may be active or passive. Active location detectors interact with the relays to both receive messages from the relays and transmit messages to the relays. Both active and passive location detectors receive transmissions from the relays and determine their position relative to a predetermined impact point of the munition. Passive location detectors include receivers only. These detectors are carried by individuals or vehicles. Each detector determines its own position and the lethality of the fired munition round on each individual or vehicle. Damaged or destroyed individuals are disabled from further participation in the war game.

Passive location detectors are more cost efficient since no transmitter is required. The passive location detectors determine their own position. The present passive location arrangements limit the number of relays which are employed to transmit position information to potential targets and also transmit the location and the firing information in a single burst. Due to interference from mountainous terrain, foliage, and weather conditions, information transmitted from the relays to the passive location detector is often not received or received in an incomplete form. Further, since the solution to position locations in a multi-lateration process are hyperbolic, two or more locations may fit the solution where there are limited relay transmissions of position information.

It is desirable to provide a passive location arrangement wherein the location detectors may accurately detect their position and munition firing information in a non-interfering mode.

SUMMARY OF THE INVENTION

In accordance with the present invention, a novel synchronized time transfer position detection arrangement is shown.

A position location arrangement includes time transmitter relays which are coupled to the time transmitter. The relays receive time information from the time transmitter. The relays repeatedly re-transmit time information in a plurality of time slots. A location determining device is coupled to the relays. The location determining device self determines its location from the transmitted time information in the plurality of time slots.

A time transfer position location method includes the steps of sending messages from a mission control station to a plurality of relays. The message indicates that the relays are to transmit position location information. Each of the relays synchronizes to a GPS satellite clock. Each relay then transmits a time pulse which is the position location information along with the relay's identification in a particular time slot of an information frame. Each relay then repeats the synchronizing and transmission of the position information at a particular frequency.

BRIEF DESCRIPTION OF THE DRAWINGS

FIG. 2 is a block diagram of each of the relay stations shown in FIG. 1.

FIG. 3 is a block diagram of a player's position location detector.

FIG. 5 is a timing diagram of the information transmitted by each of the relays.

DESCRIPTION OF THE PREFERRED EMBODIMENT

Figure 1:
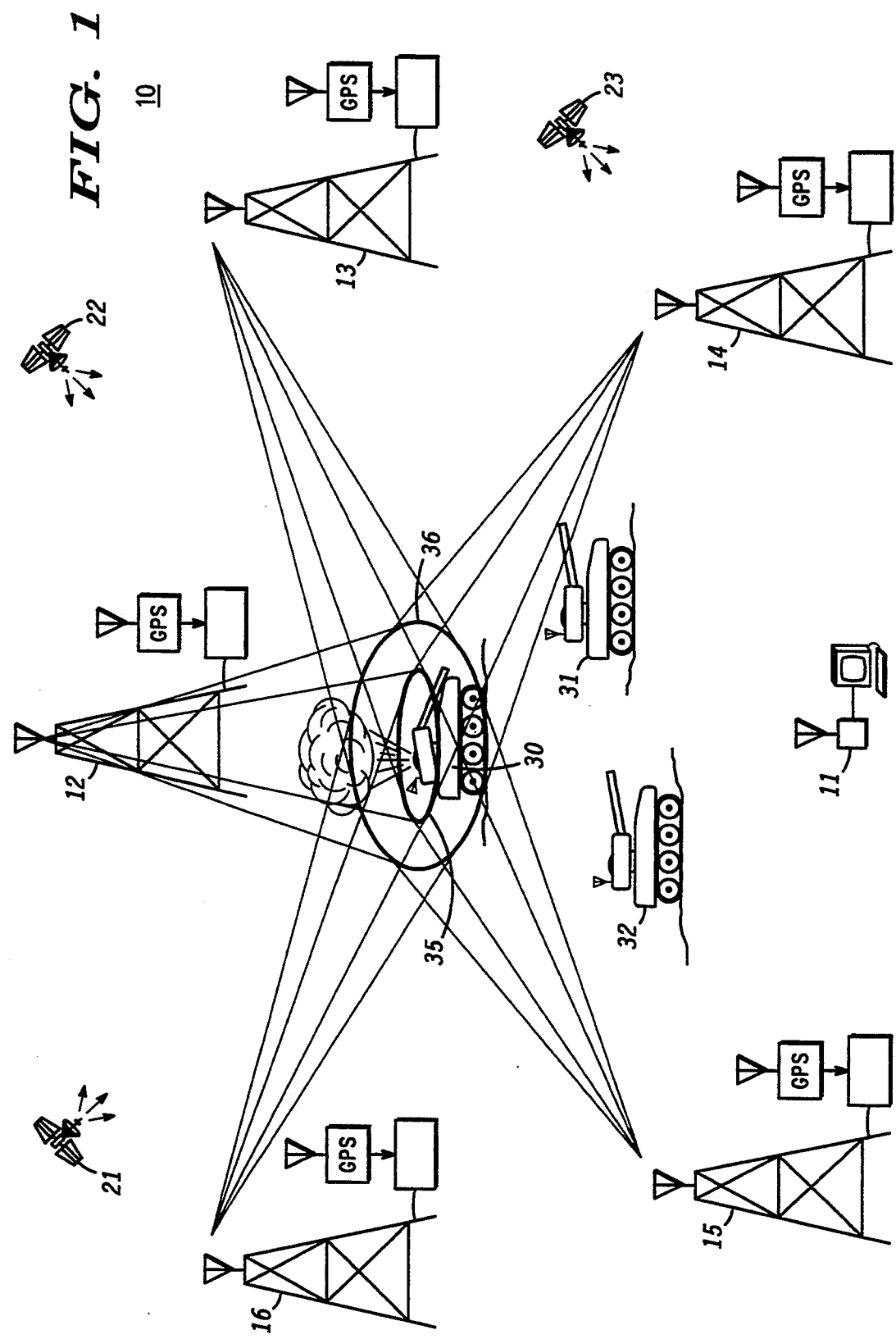
FIG. 1 is a position location system in accordance with the present invention.

FIG. 1 depicts a war game battlefield 10. The battlefield 10 depicts mission control station 11, relays 12-16, NAVSTAR Global Positioning System (GPS) satellites 21-23, and targets 30-32. Also shown is a hit zone 35 which encompasses the lethal affects of a simulated fired round of munition and a near-miss zone 36.

U.S. Pat. No. 4,976,619 is hereby incorporated by reference.

Under the control of an operator (not shown), mission control station 11 transmits a message to each of the relays 12-16 that the relays (actuators) 12-16 may begin to transmit information to each target 30-32 so that player detection devices as discussed in the above-mentioned patent associated with each target 30-32 may self-determine its own location. Although, the targets 30-32 shown are tanks, targets such as individual soldiers or other vehicles are equally adapted to be included in this system.

Each relay 12-16 includes a processor, receiver and transmitter and a GPS receiver (GPS). Each of the relays 12-16 synchronizes its transmission with a fixed time delay with respect to GPS determined time. Therefore, each of the relays 12-16 are synchronized with one another. Instead of a minimum of three relay stations being used for the multi-lateration location detection, all available relays 12-16 are employed. The present invention is not intended to be limited to the use of just five relays. In fact, testing of such systems as the present invention is conducted at the National Training Center at Fort Irwin, Calif. At this facility, up to 44 relay station sites are available for use. The greater number of transmitting relay stations there are, the greater likelihood that the player detection device will receive more accurate position location information and be able to better process the location information to eliminate the erroneous hyperbolic solutions to the location detection methodology. As a result, each of the 44 relay stations may transmit position information so that the player detection device of the targets 30-32 may determine an accurate position irrespective of mountainous terrain, foliage, and weather.

Each of the GPS receivers associated with relays 12-16 is able to calculate its own position and time. The local time calculated by each of the relays 12-16 is accurate and since each of the relay stations 12-16 have the same time, the relays 12-16 are synchronized. Since each of the relays is synchronized, each relay 12-16 transmits position location information in a time division multiplex (TDM) time slot separate from each of the other relays 12-16. As a result, the player detection device of each target 30-32 sees a time division multiplexed stream of data being transmitted to it. The time division multiplexing eliminates the problems of interfering transmissions among the relays 12-16.

Next, the mission control station 11 determines which of the relays 12-16 will transmit fire mission information to the targets. The fire mission information includes the targeted location of the munition, the type of munition, and an indication of the effect of lethal range of the munition. Not all relays are required to transmit fire mission information. However, the more relays that transmit fire mission information, the greater the probability that the target 30-32 will receive the message. For example, while all relay stations 12-16 are transmitting position location information to targets 30-32, only relay stations 12, 13, and 15 may be selected to transmit the fire mission information. The fire mission information is transmitted by the selected relays, in this case 12, 13, and 15, to the targets 30-32 in another sequence of time slots within a frame of information. The frame of information which includes the position location signals from each of the relays 12-16 and the fire mission information from those relays which have been selected defines the basic information frame and is repeated at regular time intervals synchronous to GPS determined time. A preferred time interval for transmission of the time information is once per second. One pulse per second is typically provided as an output by GPS receivers. Relay stations which are not selected to transmit fire mission information simply make no transmission during their appropriate time slot for fire mission information. As a result, the frame contains two groups of information. The first group being position location information and the second group being fire mission information. The position location group of information within the frame of information is constantly repeated. Fire mission information is only sent once when a new fire mission is called for by the mission control station 11. The repetition of the of the position location information group of the frame of information allows the targets to obtain information on a second or third transmission that it was unable to obtain on prior transmissions due to weather, terrain, foliage, or movement of the target 30-32.

FIG. 2 depicts a block diagram of each relay 12-16 including its respective GPS receiver 40. GPS receiver 40 receives position and time information from at least one of the GPS satellites 21-23 and converts this to longitude, latitude, and time information. Loran System may also be employed to transmit the time and position information. Each GPS receiver uses the time information received from the same GPS satellite or satellites. Preferably each GPS receiver will receive the time information from a single GPS satellite and solve for time only with the position coordinates having been previously determined by survey. GPS receiver 40 is coupled to processor 42 of the relay. Processor 42 is coupled to RF transmitter 44 and to RF receiver 48. Circulator 46 couples antenna 49 to both the RF transmitter 44 and the RF receiver 48.

Processor 42 receives a timing signal from GPS receiver 40 and converts it to a time which is synchronized with the processors of each of the other relays. In the appropriate time slot, processor 42 formulates a message including its identification which may be coded and a time pulse. In another time slot if selected, the processor formulates the fire mission information which it has received from the mission control station 11. In the appropriate time slot, processor 42 transmits the position information and fire mission information to RF transmitter 44. RF transmitter 44 then transmits this information in the appropriate time slot to each of the targets 30-32. Incoming information from the mission control station 11 is received by antenna 49 and transmitted through circulator 46 to RF receiver 48. RF receiver 48 transmits this information to processor 42 which stores and uses the information if required in the fire mission transmission information broadcast to targets 30-32.

FIG. 3 depicts the player detection device in block diagram form. Player detection device 50 includes antenna 52 which is coupled to RF receiver 54. Receiver 54 is coupled to processor 56.

Antenna 52 receives the frame of information transmitted by each of the relay stations 12-16. RF receiver 54 down converts this information and transmits it in digital form to processor 56. Processor 56 extracts the position information from each of the relay station frames and verifies the identity of each relay station to be accurate and transmitted in the appropriate time slot. Processor 56 then determines its own location via methods such as those described in the above-referenced patent incorporated by reference U.S. Pat. No. 4,976,619.

Due to the fact that processor 56 has many transmissions of the position information transmitted from the relays, it can calculate the proper position of itself and eliminate any erroneous hyperbolic solutions that may exist. Since even if the targets 30-32 are moving and due to weather or terrain conditions a frame of information is missed, processor 56 may interpolate or predict its current position from previous positions for information frames transmitted previously. Again, this helps to eliminate any hyperbolic solutions which are clearly erroneous. As a result, the position which processor 56 calculates of itself, the target, is highly accurate and can be carefully compared to the position of the fired round of munition to determine the affects of the munition upon the target.

Figure 4:
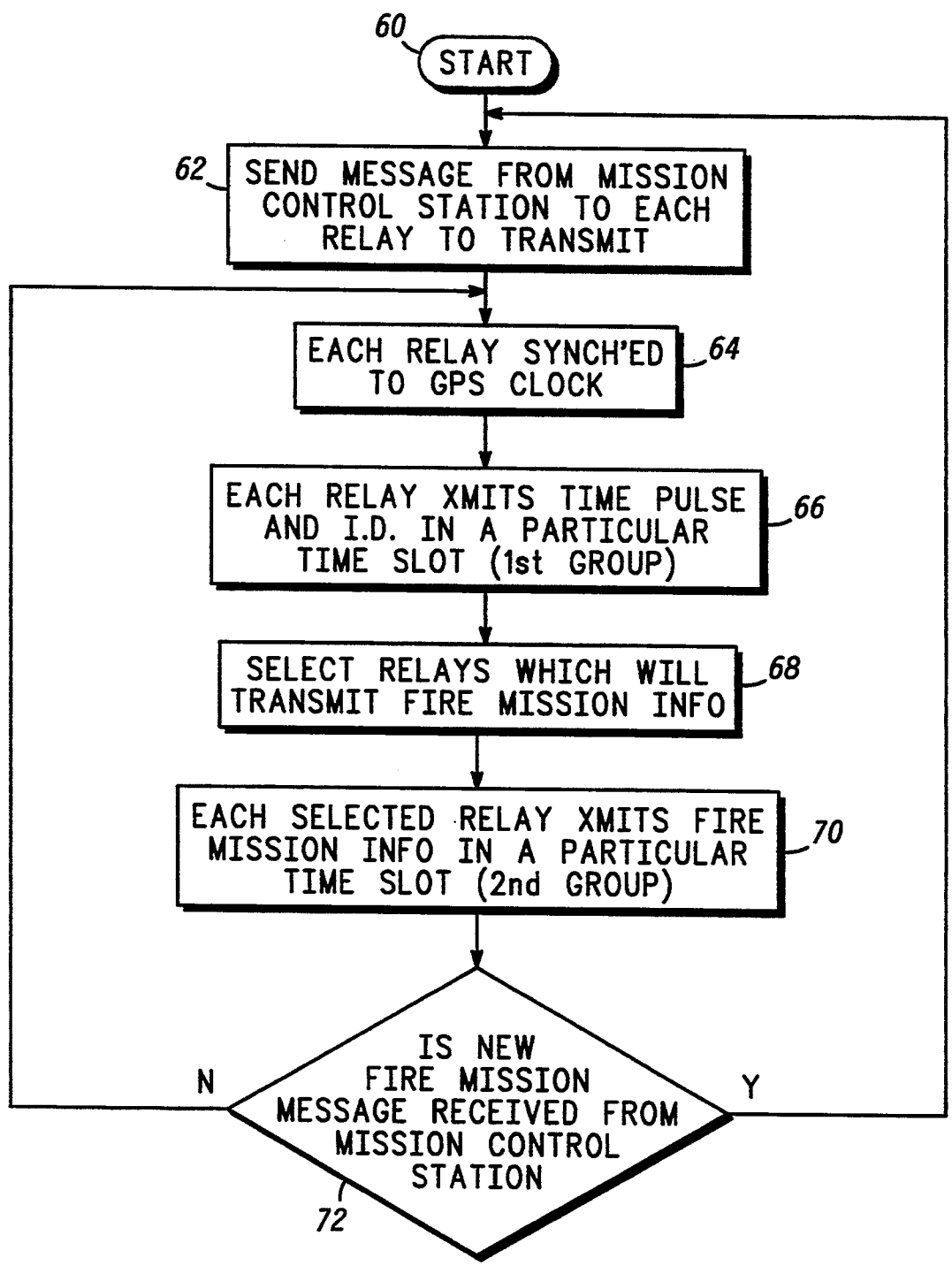
FIG. 4 is a flow chart of a position location method in accordance with the present invention.

The synchronized multi-lateration location method is depicted in FIG. 4. The process is initiated and block 60 is entered. First, mission control station 11 transmits a message to each of the relays to begin transmission of position location information and to prepare for transmitting fire mission information, block 62. Each relay 12-16 is synchronized to the GPS clock received from the same one of the GPS satellites 21-23. This synchronization assumes that each of the relays reads the same ephemerous data from the same one of the GPS satellites 21-23 (common view), block 64.

Each relay then forms and transmits a time slot of information including the time pulse and an encoded identification of the relay transmitting. These frames of location information are transmitted in separate time slots for each relay, block 66. The position location information including time pulse encoded identification comprise a first group of time slots. Next, the mission control station determines which of the relays will transmit the fire mission information based on estimated path loss from the relays to the targeted area, block 68. Next, each selected relay transmits the fire mission information in a particular time slot separate and distinct from the position location information but within the same frame, block 70. Relays which are not selected to transmit fire mission information perform no transmission in their appropriate time slot. The fire mission information forms a separate group of information comprising the information frame transmitted by each relay. Each player detection device then processes the information as indicated above and in the above-mentioned U.S. patent. Lastly, it is determined whether a new fire mission message is received by the relay station from the mission control station 11. If one is not received, control is transferred from block 72 to block 64 where re-transmission of the position information of the frame of information is repeated once per second approximately. If a new fire mission message has been received from mission control station 11, block 72 transfers control via the Y path to block 62 and each relay is re-synchronized and prepares for the transmission of new position location and fire mission information.

FIG. 5 depicts the information frame mentioned above. Each frame of position location information includes a time pulse (TP) and a relay identification number which may be encoded for security reasons. The timing pulse is transmitted first and is the position location information. The player detection devices detect the timing pulse which is used by the position determination methodology within the player's detection device. The second portion information frame includes the fire mission information. The fire mission information is transmitted for each of the selected relays. As an example in FIG. 5, relays 1 and 7 have been shown to be the selected relays for transmission of fire mission information. The fire mission information includes the location of the deployed round of munitions and an indication of the type of munitions and ranges of the lethal affects of such round. With this information, the player detection device may determine if it has been destroyed, damaged or is unharmed. If destroyed, the player detection device may activate an inhibit signal to disable the tank, soldier's rifle, or other weapon.

As can be seen, using many relay stations to transmit position location information greatly increases the accuracy of such information and aids in the hyperbolic solutions by eliminating erroneous solutions to the detection method. In addition, repeating the information in time division multiplex fashion allows the accurate detection of such information and minimizes interference among transmitting stations. In addition, the affects of weather, terrain, and movement are minimized by the constant repetition of information and the increased number of transmitting relays.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A position location arrangement for self location of an object, said position location arrangement comprising:

means for transmitting time information;

relay means coupled by radio signals to said means for transmitting, said relay means for receiving said time information, said relay means for retransmitting said time information in a repeated plurality of time slots;

control means coupled by radio signals to said relay means, said control means for transmitting fire mission information to selected ones of said relay means;

said relay means for re-transmitting said fire mission information in a plurality of second time slots;

said object including location determining means coupled by radio signals to said relay means, said location determining means for self-determining its location from said repeatedly transmitted time information in said plurality of time slots;

said means for transmitting time information includes at least one global positioning system (GPS) satellite for transmitting said time information;

said relay means includes a plurality of GPS receiver means for receiving said time information and converting said time information for use by said GPS receives means; and said relay means further includes a plurality of relay devices corresponding on a one-for-one basis to said plurality of GPS receiver means, each of said plurality of relay devices for receiving said time information and re-transmitting an indication of said time information in a predetermined time slot.

2. A position location arrangement as claimed in claim 1, wherein said means for transmitting time information alternately includes a Loran system.

3. A position location arrangement as claimed in claim 1, wherein each of said plurality of relay devices includes processor means coupled to said corresponding GPS receiving means, said processor means for converting said time information to digital form.

4. A position location arrangement as claimed in claim 3, wherein each of said relay devices further includes:

RF transmitter means coupled to said processor means, said transmitter means for converting said time information in digital form to a radio frequency signal;

RF receiver means coupled to said processor means, said receiver means for converting radio frequency signals to digital form for transmission to said processor means; and an antenna coupled to said receiver means and to said transmitter means, said antenna for transmitting and receiving RF signals; and circulator means coupled between said antenna, said RF transmitter means and said RF receiver means, said circulator means for transmitting RF signals between said RF transmitter means and said antenna and between said antenna and said RF receiver means.

5. A position location arrangement as claimed in claim 3 wherein said location determining means includes:

antenna means coupled by radio signals to each of said antennas of said plurality of relay devices, said antenna means for receiving said transmitted time information;

RF receiver means coupled to said antenna means, said receiver means for converting said RF signals to digital form; and processor means coupled to said RF receiver means, said processor means for determining self location in response to said time information in said plurality of time slots.

6. In a battlefield simulation system including a plurality of personnel and vehicles having location detection devices, said of said location detection devices for assessing injuries and damages to said personnel and to said vehicles inflicted by the firing of a simulated round of munition, a position location arrangement for self location relative to said simulated round of munition, said position location arrangement comprising:

means for transmitting time information;

relay means coupled to said means for transmitting, said relay means for receiving said time information, said relay means for repeatedly re-transmitting position location information in a plurality of first time slots;

control means coupled to said relay means, said control means for transmitting fire mission information of said simulated round of munition to selected ones of said relay means;

said relay means for re-transmitting said fire mission information in a plurality of second time slots;

location determining means coupled to said relay means, said location determining means for self determining its location and damage and injury inflicted by said simulated round of munition;

said position location information including a timing pulse and an identity of said relay device corresponding to a particular time slot;

a plurality of fire mission information transmitted in time slots corresponding to said selected relays;

said means for transmitting time information includes at least one Global Positioning System (GPS) satellite;

said relay means includes a plurality of GPS receiver means for receiving said time information and converting said time information for use by said GPS receiver means; and said relay means further includes a plurality of relay devices corresponding on a one-for-one basis to said plurality of GPS receiver means, each of said plurality of relay devices for receiving said time information and re-transmitting an indication of said time information in a predetermined time slot.

7. In a battlefield simulation system, a position location arrangement as claimed in claim 6, wherein each of said plurality of relay devices includes processor means coupled to said corresponding GPS receiver means, said processor means for converting said time information to digital form.

8. In a battlefield simulation system, a position location arrangement as claimed in claim 7, wherein each of said relay devices further includes:

RF transmitter means coupled to said processor means, said transmitter means for converting said time information in digital form to a radio frequency signal;

RF receiver means coupled to said processor means, said receiver means for converting radio frequency signals to digital form for transmission to said processor means; and an antenna coupled to said receiver means and to said transmitter means, said antenna for transmitting and receiving RF signals; and circulator means coupled between said antenna, said RF transmitter means and said RF receiver means, said circulator means for transmitting RF signals between said RF transmitter means and said antenna and between said antenna and said RF receiver means.

9. In a battlefield simulation system, a position location arrangement as claimed in claim 7, wherein said location determining means includes:

antenna means coupled to each of said antennas of said plurality of relay devices, said antenna means for receiving said transmitted time information;

RF receiver means coupled to said antenna means, said RF receiver means for converting said RF signals to digital form; and processor means coupled to said RF receiver means, said processor means for determining self location in response to said time information in said plurality of time slots.

10. In a battlefield simulation system, a position location arrangement as claimed in claim 6, wherein said control means includes processor means for selecting certain ones of said relay devices and for transmitting fire mission information to those selected ones of said relay devices.

11. A time transfer position transmission method comprising the steps of:

sending a message from a mission control station to a plurality of relays, said message indicating that each relay is to transmit position location information;

synchronizing each relay to a same GPS satellite clock;

transmitting from each relay a time pulse and a relay identity in a first set of time slots within a frame of information;

repeating said steps of synchronizing and transmitting if no new message is received from the mission control station;

selecting by said mission control station which of the relays will transmit fire mission information;

said step of transmitting includes the step of transmitting from each of the selected relays the fire mission information in a second set of time slots within the information frame; and iterating said steps of sending, synchronizing, transmitting, selecting, and transmitting fire mission information, if new fire mission information is received from the mission control station.

12. A time transfer position transmission method as claimed in claim 11, wherein said step of transmitting is repeated approximately once per second.

* * * * *

UNITED STATES PATENT AND TRADEMARK OFFICE
CERTIFICATE OF CORRECTION

PATENT NO. : 5,382,958
DATED : January 17, 1995
INVENTOR(S) : Mark Richard FitzGerald It is certified that error appears in the above-indentified patent and that said Letters Patent is hereby corrected as shown below:

In column 7, claim 6, line 7, delete words "said of".

Signed and Sealed this

Thirtieth Day of April, 1996

Attest:

BRUCE LEHMAN

*Attesting Officer*   *Commissioner of Patents and Trademarks*